(No Model.)
E. H. MACINTOSH.
DOUGH RAISER.
No. 505,364. Patented Sept. 19, 1893.
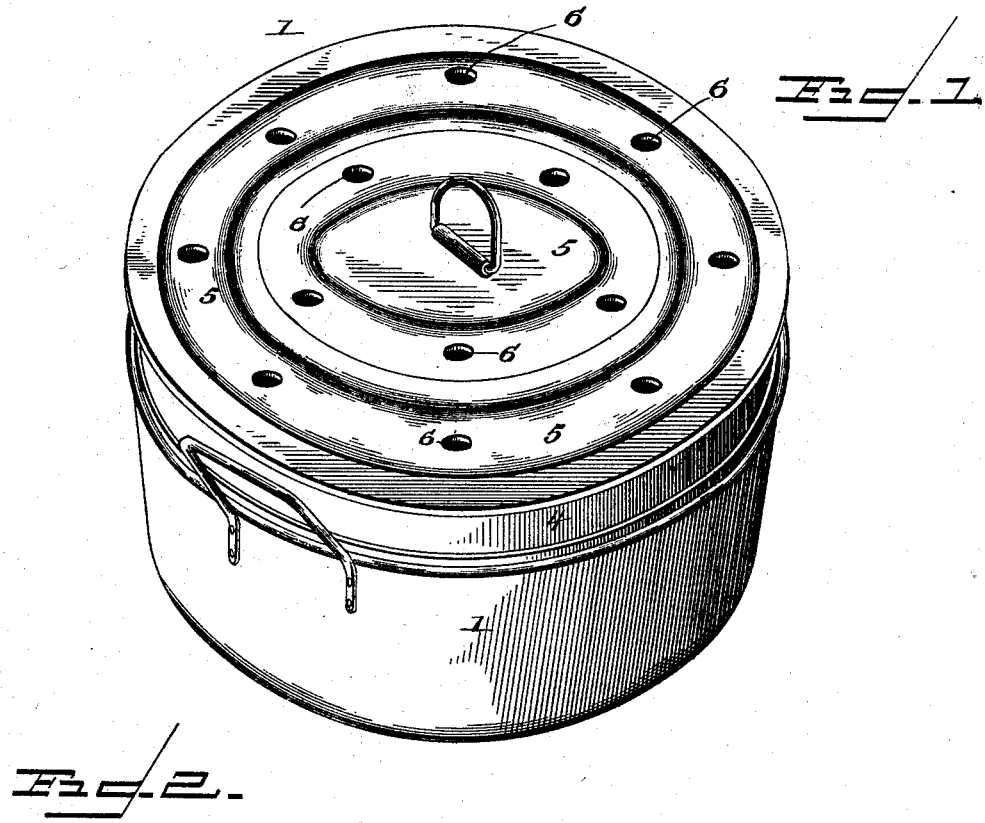
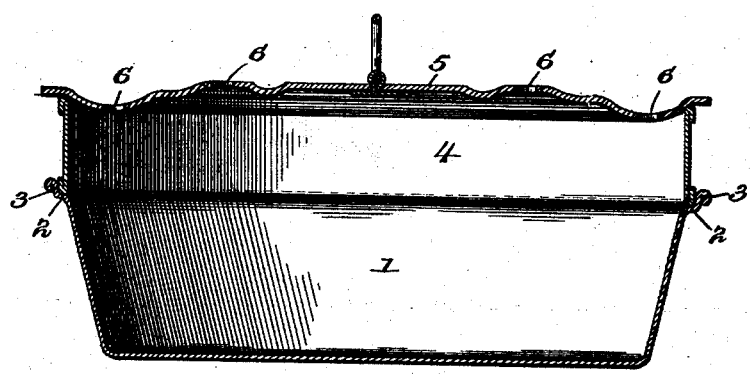
Witnesses
E. K. Stewart
N. F. Riley
Inventor
Elizabeth H. MacIntosh,
By her Attorneys,
C. A. Snow & Co.

UNITED STATES PATENT OFFICE.

ELIZABETH HARRIOTT MacINTOSH, OF LITTLE ROCK, ARKANSAS.

DOUGH-RAISER.

SPECIFICATION forming part of Letters Patent No. 505,364, dated September 19, 1893.

Application filed January 31, 1893. Serial No. 460,309. (No model.)

*To all whom it may concern:*

Be it known that I, ELIZABETH HARRIOTT MACINTOSH, a citizen of the United States, residing at Little Rock, in the county of Pulaski and State of Arkansas, have invented a new and useful Dough-Raiser, of which the following is a specification.

My invention relates to an improvement in dough-raising pans, and it has for its object to provide means whereby an ordinary pan, such as is ordinarily employed for dough-raising purposes, may be extended by means of an attachment to accommodate a larger raising than the pan proper, and prevent the dough from flowing over the sides and wasting, thus adapting a pan of ordinary size, with an attachment embodying my invention, to fulfill the functions of two pans of different sizes, and avoiding the necessity of employing two pans for dough raising.

The invention consists in the construction and novel combination and arrangement of parts hereinafter fully described, illustrated in the accompanying drawings and pointed out in the claims hereto appended.

In the drawings—Figure 1 is a perspective view of a pan constructed in accordance with this invention. Fig. 2 is a vertical sectional view.

Like numerals of reference indicate corresponding parts in both figures of the drawings.

1 designates a pan having its upper edge struck outward to form an approximately horizontal flange 2 and a vertical flange 3, and provided at the extreme upper edge with a bead. The outwardly extending horizontal flange and the upwardly projecting vertical flange form an interior groove or way adapted to receive and have sprung into it a cylindrical extension ring 4, which when in position on the pan forms an extension of the sides of the pan to increase the capacity of the latter to prevent the contents thereof running over and also to avoid the necessity of employing a number of pans of different sizes. The cylindrical ring or band 4 is provided at both edges with a bead, and either one is adapted to be sprung into the interior groove of the pan, in order to avoid the exercise of any care in arranging and securing the extension ring or band upon the pan.

The spring of the joint between the ring and the pan is sufficient to hold the ring securely in place. The pan is provided with a cover 5 and the latter has a series of perforations 6 adapted when the cover is in place to permit access of air to the interior and to allow any gases which might arise from the contents of the pan to escape. As both edges of the band or ring are identical in construction, either may be fitted into the groove in the edge of the pan to avoid the necessity of fitting and the inconvenience of applying the wrong edge of the band to the pan.

It is the ordinary practice among housekeepers to set aside one pan for dough-raising purposes and use the same for no other purpose, and therefore in order to accommodate batches of different sizes it becomes necessary to employ a pan which is much larger than is necessary for the smaller batches; and furthermore, unless the pan is larger than the batch which is set therein it will, upon rising, flow over the sides and be wasted. But by the use of an attachment as above described the pan may be used without the extension band or ring for small batches, and with said extension band or ring for larger batches; and the band or ring being equal in diameter to the mouth of the pan, the lid or cover is adapted to fit whether the band is in place or not. Furthermore, by reason of the connection of the band to the upper edge of the pan, the former may be applied and secured by the spring-action of the metal, thus obviating the danger of the extension being displaced while in use. Also, it will be observed that the groove which is formed in the upper edge of the pan is produced by offsetting said edge outwardly, whereby, when the band is in place, its inner surface is flush with that of the pan, thus forming no shoulder or projection under which the dough in rising can lodge; and inasmuch as the extreme lower edge of the band is slightly below the plane of the extreme upper edge of the pan, there is no opportunity for the contents of the pan to escape through the joint or force its way under the band.

Changes in the form, proportion and the minor details of construction may be resorted to without departing from the principle or sacrificing any of the advantages of this invention.

What I claim is—

1. In a dough raiser, the combination with a pan provided at its upper edge with a groove or seat, of a reversible extension band or ring of even diameter throughout and having beaded edges to fit in said groove or seat, and a perforated lid or cover adapted to fit the pan or the upper edge of the band or ring, substantially as specified.

2. The combination, in a dough raiser, of a pan provided at its upper edge with a groove or seat formed by offsetting said upper edge outwardly, an extension band or ring having a beaded edge to fit in said groove or seat whereby the inner surface of the band or ring is flush with the inner surface of the pan, and a perforated lid or cover, substantially as specified.

In testimony that I claim the foregoing as my own I have hereto affixed my signature in the presence of two witnesses.

ELIZABETH HARRIOTT MacINTOSH.

Witnesses:
 THOS. MASON,
 HELENA RICHARDSON.